US011972199B2

(12) United States Patent
Jonah

(10) Patent No.: US 11,972,199 B2
(45) Date of Patent: Apr. 30, 2024

(54) POSITIONAL TEXT CONTROL FOR TEXT ENTRY AND INTERPRETATION

(71) Applicant: BMC Software, Inc., Houston, TX (US)

(72) Inventor: James D. Jonah, Highland, MI (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/652,827

(22) Filed: Feb. 28, 2022

(65) Prior Publication Data

US 2023/0274079 A1     Aug. 31, 2023

(51) Int. Cl.
G06F 40/166      (2020.01)
G06F 16/23       (2019.01)

(52) U.S. Cl.
CPC ........ G06F 40/166 (2020.01); G06F 16/2343 (2019.01)

(58) Field of Classification Search
CPC .................................................... G06F 40/166
See application file for complete search history.

(56) References Cited

U.S. PATENT DOCUMENTS 5,706,496 A * 1/1998 Noguchi et al. ........ G06F 17/30
2008/0316212 A1* 12/2008 Kushler .................. G06T 11/00
2012/0197770 A1* 8/2012 Raheja et al. .......... G06F 15/16
2016/0357710 A1* 12/2016 Kajimoto .............. G06F 17/211
2020/0042582 A1* 2/2020 Maerhufu et al. ...... G06F 17/24

OTHER PUBLICATIONS

B. Reselman: "Best of 2018: The Beauty of the COBOL Programming Language," available online at <https://devops.com/the-beauty-of-the-cobol-programming-language-v2/>, Dec. 24, 2018, 21 pages.
J. Marshall: "Using Overtype and Insert Modes in Microsoft Word," available online at <https://www.lifewire.com/overtype-and-insert-modes-microsoft-word-3539682>, Nov. 4, 2019, 7 pages.

* cited by examiner

Primary Examiner — James J Debrow
(74) Attorney, Agent, or Firm — Brake Hughes Bellermann LLP

(57) ABSTRACT

Described techniques provide a dynamic insert operation that enables easy, intuitive, reliable text entry by a user, while maintaining text within special-purpose positions that are needed, e.g., for later compiling or other text interpretation. For example, one or more positions may be locked, e.g., within a line or other sequence of positions. Then, text may be entered into a text position prior to the locked position(s). The dynamic insert operation may enable insertion of the text, movement of any existing text from the text position to a subsequent position, and maintenance of locked text within the locked position. Similarly, but conversely, if text (e.g., a character) is deleted from the text position, the dynamic insert operation may enable the deletion of the text, movement of any existing subsequent text from the subsequent position to the text position, and maintenance of locked text within the locked position.

20 Claims, 9 Drawing Sheets

| Locked ,502 | Editable ,506 | Locked ,512 | Editable ,516 |
|---|---|---|---|
| 123456 ←504 | Dcl myVariable Char(108); //myComment... ↶508 | myTask#12 ↑514 | More editable text ↶518 |

FIG. 5

| Editable ,602 | Locked ,606 | Locked ,610 | Editable ,614 |
|---|---|---|---|
| Dcl myVariable Char(108); //myComment... ↶604 | <X> 608 | <myTask#123> 612 | More editable text 616 |

FIG. 6

```
Editing: SMPLCOB.cbl on External Files
----*A-1--B-+----2----+----3----+----4----+----5----+----6----+----7----+----8
 1
 2
 3
 4⊕           IDENTIFICATION DIVISION    □
 6    4321
 7   ######  This is a simple program without copybooks used to verify simple
 8                   matching.
 9⊕          ENVIRONMENT DIVISION
12①  ######  DATA DIVISION
13①          FILE SECTION
14①          WORKING-STORAGE SECTION
⊗15  ######  01  VAR-ONE                  PIC 449    VALUE      4asdfsdf       ###
16   ######  01  VAR-TWO                  PIC 9      VALUE 0.                  #####   #######
17   ######  01  VAR-TWO-TWO              PIC 9      VALUE 0.                          ########
18   ######  01  VAR-THREE                PIC 9      VALUE 0.                          12345678
19   ######      05  VAR-THREE-FIVE                                                    99999999
20                                                                                    99999999
21
22
23
24
25           *02  PPW:6125:REC.
26           *    05  PPW:6125:ACTION-CODE      PIC X(01)
27           *    05  PPW:6125:RETURN-CODE      PIC 9(02)
28                    88  PPW:6125: SUCCESSFUL   VALVE ZERO
29
```

FIG. 8

| Editing: SMPLCOB.cbl on External Files | | 802  804 | | | | | | 806 | | | | | 808 | 810 |
|---|---|---|---|---|---|---|---|---|---|---|---|---|---|---|
| | | ----+*A-1-B-+----2----+----3----+----4----+----5----+----6----+----7----+----8 | | | | | | | | | | | | |
| 1 | | | | | | | | | | | | | | |
| 2 | | | | | | | | | | | | | | |
| 3 | | | | | | | | | | | | | | |
| 4⊕ | | | IDENTIFICATION DIVISION | □ | | | | | | | | | | |
| 6 | 4321 | | | | | | | | | | | | | |
| 7 | ###### | | This is a simple program without copybooks used to verify simple | | | | | | | | | | mfhjxj0 | |
| 8 | | | matching. | | | | | | | | | | ####### | |
| 9⊕ | ###### | | ENVIRONMENT DIVISION | | | | | | | | | | | |
| 12① | | | DATA DIVISION | | | | | | | | | | □ | |
| 13① | | | FILE SECTION | | | | | | | | | | | |
| 14① | | | WORKING-STORAGE SECTION | | | | | | | | | | | |
| ⊗15 | ##### | 01 | VAR-ONE | | | | | PIC | 4499a9s9d | VALUE 4. | | | ######## | |
| 16 | | 01 | VAR-TWO | | | | | PIC | 9 | VALUE 0. | | } 1008 | ######### | |
| 17 | ###### | 01 | VAR-TWO-TWO | | | | | PIC | 9 | VALUE 0. | | | | |
| 18 | | 01 | VAR-THREE | | | | | PIC | 9 | VALUE 0. | | | 12345678 | |
| 19 | ###### | | 05  VAR-THREE-FIVE | | | | | | | | | | 99999999 | |
| 20 | ###### | | | | | | | | | | | | 99999999 | |
| 21 | | | | | | | | | | | | | | |
| 22 | | | | | | | | | | | | | | |
| 23 | | | | | | | | | | | | | | |
| 24 | | | | | | | | | | | | | | |
| 25 | | *02 | PPW:6125:REC. | | | | | | | | | | | |
| 26 | | * | 05  PPW:6125:ACTION-CODE | | | | | | | PIC X(01) | | | | |
| 27 | | * | 05  PPW:6125:RETURN-CODE | | | | | | | PIC 9(02) | | | | |
| 28 | | * | 88  PPW:6125: SUCCESSFUL | | | | | | | VALVE ZERO | | | | |
| 29 | | | | | | | | | | | | | | |

POSITIONAL TEXT CONTROL FOR TEXT ENTRY AND INTERPRETATION

TECHNICAL FIELD

This description relates to text entry.

BACKGROUND

Text editors provide many different type of text entry techniques. For example, word processors enable convenient text entry with many options for, e.g., formatting, organizing, and otherwise presenting entered text. In other examples, spreadsheets typically receive text entries within arrays of cells, while presentation software may be optimized to receive text in conjunction with various types of multimedia.

Some special purpose text editors are designed for use in more specific contexts. For example, a text editor used in a programming context may receive text in a manner that is compatible with a compiler. For example, a programmer may enter the text of a program using a text editor, and a compatible compiler may then execute a conversion of the entered text into machine code (or other lower-level computing representation) for subsequent program execution.

In these and other contexts, an accuracy of such text conversion (or text mapping, or other text interpretation) may rely in part on a position of the text being converted. For example, text in one position may be handled differently than text in another position.

For these or similar reasons, a user entering text may concurrently attempt to ensure that the text is entered in a correct position(s) for an intended purpose. However, such reliance on the user is prone to error and inconvenient for the user. For example, in programming contexts, large quantities of text may be required to be entered, and the inconvenience of ensuring text entry accuracy may be further compounded by subsequent compiler errors that occur when text is inadvertently entered in incorrect positions.

SUMMARY

According to some general aspects, a computer program product may be tangibly embodied on a non-transitory computer-readable storage medium and may include instructions. When executed by at least one computing device, the instructions may be configured to cause the at least one computing device to determine a number of sequential text positions configured to receive text and determine a locked position adjacent to the sequential text positions. When executed by the at least one computing device, the instructions may be configured to cause the at least one computing device to receive a text edit at an edited position of the sequential text positions and maintain the number of sequential text positions by adding or deleting a space between the edited position and the locked position in response to the text edit.

According to other general aspects, a computer-implemented method may perform the instructions of the computer program product. According to other general aspects, a system, such as, in non-limiting examples, a personal computer, workstation, or mainframe system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 5 illustrates an example of FIGS. 1-4, in the context of the COBOL programming language.

FIG. 6 illustrates an example of FIGS. 1-4, in the context of the Assembly programming language.

FIG. 8 is a first example screenshot illustrating an example implementation.

FIG. 10 is a third example screenshot illustrating the example implementation of FIGS. 8 and 9.

DETAILED DESCRIPTION

Figure 1:
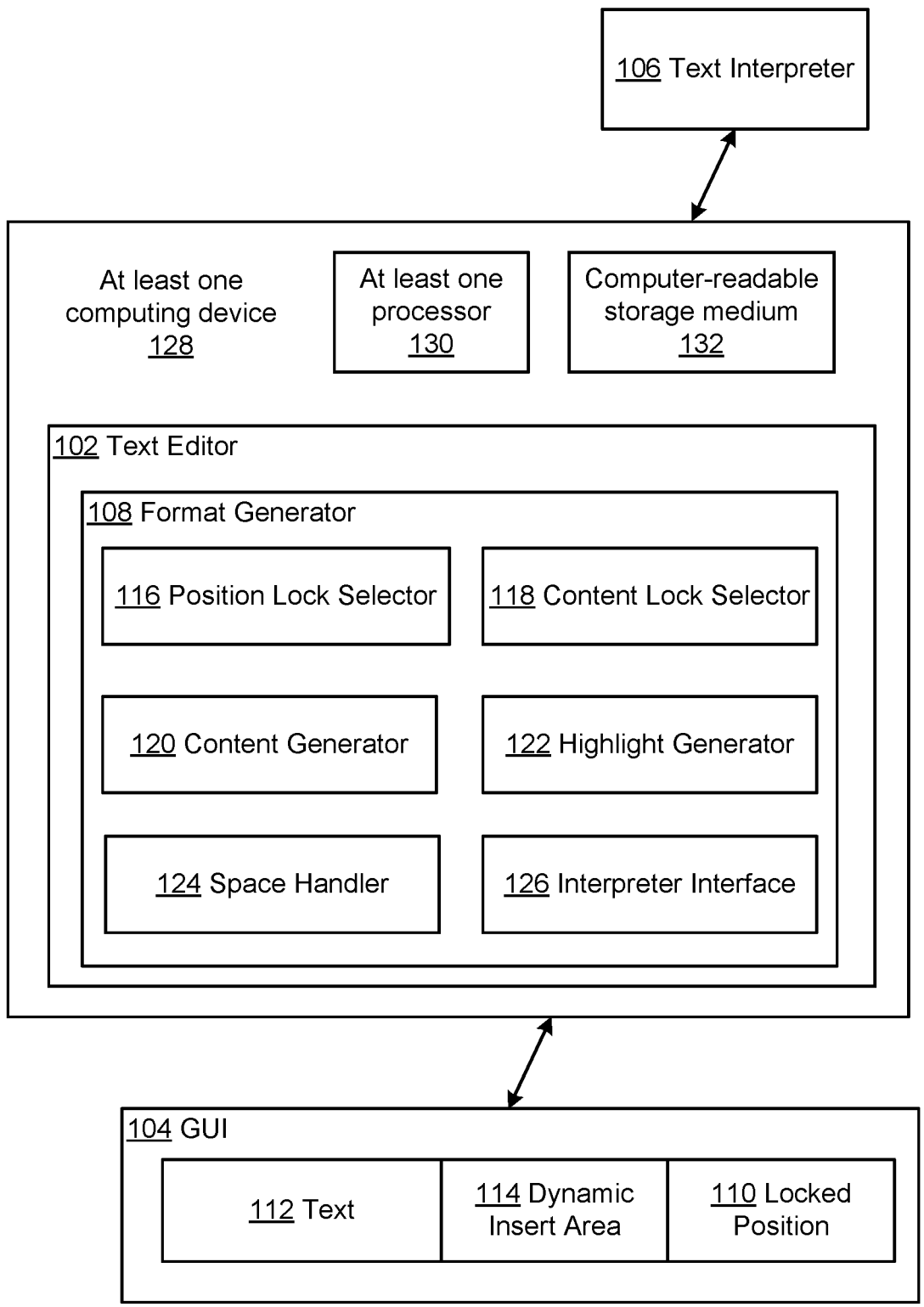
FIG. 1 is a block diagram of a text entry system for positional text control for text entry and interpretation.

Described systems and techniques provide convenient, reliable, and accurate text entry. Entered text may then be compiled, converted, mapped, or otherwise interpreted in an accurate and reliable manner. Users entering text may do so with few or no requirements to switch between text entry modes. Users entering text may be provided with visual cues or other indicators that demonstrate where and how text may (or may not) be entered. Moreover, users entering text may do so in a convenient, intuitive manner, without being required to insert or delete excess spaces to manually align text in a desired manner.

For example, as referenced above, many text editors provide for text entry within a continuous sequence of text entry positions. For example, in a left-to-right language such as English, users may enter text in a line, until an end of the line is reached. Entered text may include any available character or symbol and may also include one or more spaces.

In such contexts, and similar contexts, a text entry position, or just position, refers to a defined unit or subdivision within a line or other area for which a character, symbol, or space may be entered or designated. Thus, a space refers simply to a designation of a position as being empty, or unfilled by any specific character or symbol.

Text editors provide users with an intuitive experience within a graphical user interface (GUI) by, e.g., receiving text within corresponding positions. At the same time, text editors process received text in terms of bytes of information. Therefore, depending on a language being used and other factors, there may or may not be a one-to-one relationship between a character/symbol and a byte of information. For example, the English language is generally a single byte language, with a one-to-one relationship between a character/symbol and a byte of information, but other languages, such as various Asian languages or characters (e.g., kanji), or the Arabic language, may require more than one byte, e.g., two bytes, to represent an individual character.

In all such scenarios, and similar scenarios, conventional text editors, such as text editors that may be used with programming languages such as, e.g., PHP, Ruby, Python, or JavaScript, may require text entry in a specific format(s) that is compatible with a compiler or other text interpreter. For example, for the COBOL programming language, a COBOL text editor may provide a plurality of horizontal lines, each having 100 or more positions. Positions 1-6 and 72-80 may be designated as having defined meanings for purposes of interpreting (e.g., compiling) text entered into those positions, e.g., for execution of a COBOL program. Across multiple horizontal lines of text (i.e., vertically), the designated positions of 1-6 and 72-80 thus effectively define two columns.

As referenced above, conventional text editors typically provide a continuous sequence of positions into which text may be entered and require that the user entering text be responsible for doing so in a manner that results in forming the de facto columns just described. That is, the user is responsible for manually ensuring that the type of text required in the de facto columns is correct in position, form, and content.

To assist in text entry, conventional text editors include different modes of text entry. For example, in an overwrite mode, a user may enter text into a position filled with an existing character, and the newly-entered text (e.g., character) will take the place of the existing character. In other words, if the letter "a" is in position 1, and a user enters the letter "b" into position 1, then the letter "a" will be removed and the letter "b" will take its place, while no change to position 2 (or subsequent positions) will occur.

In another example, in an insert mode, a user may enter text into a position filled with an existing character, and the existing character will be moved to a subsequent position, while the new character will be entered into the position. In other words, if the letter "a" is in position 1, and a user enters the letter "b" into position 1, then the letter "a" will be moved to position 2. Moreover, if characters have been entered into position 3 and any subsequent positions, then all such characters will similarly be advanced one position.

Similarly, but conversely, in insert mode, if a character is deleted from a position, then any subsequent characters will be moved to an earlier position within a line. For example, if the letter "a" is in position 1 and the letter "b" is in position 2, then deletion of the letter "a" would advance the letter "b" from position 2 to position 1, while also moving subsequent characters one position closer to a beginning of the line, as well.

Notably, text entry may include entry, removal, or movement of a space. Therefore, it is possible to move text to desired positions in insert mode by inserting or deleting spaces ahead of the text to be moved. For example, to move the letter "a" from position 1 to position 10, nine spaces may be entered ahead of the letter "a", i.e., at positions 1-9. Similarly, but conversely, the letter "a" could then be moved back to position 5 (or any intervening position) by deleting a corresponding number of spaces.

Conventional text editors require the user to repetitively select and use overwrite mode, insert mode, combinations thereof, and strategic insertion/deletion of spaces to align text in a desired manner. For example, in the COBOL example provided above, a user may be required to maintain a certain type of text within positions (or de facto column) 72-80. The user may thus enter text on a line and then use insertion or deletion of spaces in insert mode to move the entered text into desired one(s) of those positions. The user may then wish to enter text at an earlier position, such as position 50. If the user enters text in position 50 in insert mode, the user may then have to delete a space between position 50 and position 72 to maintain desired content within the positions 72-80. Alternatively, as referenced, the user may switch from insert mode to overwrite mode. Doing so would allow the user to enter new text at position 50 without deleting an intervening space between positions 50 and 72, but requires the user to actively and manually switch between insert mode and overwrite mode.

The above examples illustrate that existing text editors are inconvenient and subject to error with respect to entering text in a desired manner(s) and for an intended purpose(s). For example, if a user enters text in the COBOL programming language for a COBOL program being created, the user must frequently switch between insert and overwrite mode, and/or must frequently insert and/or delete spaces, in order to maintain desired text within desired positions. In such examples, if the user fails to maintain text in desired or required positions, then the subsequent compiling of the COBOL program may fail, leading to additional inconvenience and cost.

In contrast, described techniques provide a dynamic insert operation that enables easy, intuitive, reliable text entry by a user, while maintaining text within special-purpose positions that are needed, e.g., for later compiling or other text interpretation. For example, described techniques enable locking of one or more positions, e.g., within a line or other sequence of positions. Then, text (e.g., a character) may be entered into a text position prior to the locked position(s) within the line. The dynamic insert operation may enable insertion of the text into the text position, movement of any existing text from the text position to a subsequent position, and maintenance of locked text within the locked position. Similarly, but conversely, if text (e.g., a character) is deleted from the text position, the dynamic insert operation may enable the deletion of the text from the text position, movement of any existing subsequent text from the subsequent position to the text position, and maintenance of locked text within the locked position.

The above examples are non-limiting, and many other features and advantages may be provided using described techniques. For example, in addition to providing locked positions, described techniques may provide locked content within the locked positions, and/or may automatically generate content to be included within the locked positions. Described techniques may also enable visual highlights or other indicators that allow users to easily distinguish, identify, and use the locked positions and the dynamic insert mode. In additional examples, described techniques may enable interfacing with compilers or other text interpreters, so that locked positions (and other features) may be defined in manners that are compatible with multiple ones of such text interpreters.

FIG. 1 is a block diagram of a text entry system for positional text control for text entry and interpretation. In the example of FIG. 1, a text editor 102 provides a graphical user interface (GUI) 104 for text entry. Also in FIG. 1, a text interpreter 106 represents any software configured to read, receive, and use entered text received by the text editor 102 for an intended purpose(s).

The text editor 102 may include functionalities of any standard, conventional, or future text editor that are related to text entry. For example, the text editor 102 may provide any standard or conventional capabilities related to text formats, fonts, or margins.

Similarly, the GUI 104 may provide functionalities of any standard, conventional, or future GUI that may be compatible with the text editor 102. The GUI 104 may provide intuitive visual access to various options for formatting and otherwise entering text, as provided by the text editor 102.

To the extent that such features and functions of the text editor 102 and the GUI 104 would be known to one of skill in the art, they are not described here in detail. Nonetheless, various examples that are provided may include known features or functions, for purposes of explanation. For example, the text editor 102 may provide both the overwrite and insert modes of text entry referenced above, which are described and differentiated in various examples below with respect to, e.g., the dynamic insert mode described herein.

Both the text editor 102 and/or the GUI 104 may provide either a general-purpose word processor, or a special purpose word processor designed for use with the text interpreter 106, as described in detail, below. As also described below, in various example implementations, the text editor 102 and the GUI 104 may provide configurable compatibility with multiple different types of text interpreters, represented by the text interpreter 106.

In FIG. 1, the text editor 102 includes a format generator 108. As referenced above, and described in more detail, below, the format generator 108 enables and/or ensures text entry in a manner that is compatible with, and enables, text interpretation by the text interpreter 106.

In the simplified example of FIG. 1, the GUI 104 illustrates inclusion of a locked position 110. When text 112 is entered or deleted using the GUI 104, the format generator 108 dynamically expands or contracts a dynamic insert area 114 that is defined between the text 112 being entered and the locked position 110.

Therefore, any character or other text included within the locked position 110 will remain within the locked position 110 while the text 112 is being entered. Put another way, any such text 112 within the locked position 110 will not be pushed out of the locked position 110 by spaces moving concurrently with entry of the entered text 112, as occurs in conventional text entry scenarios.

Similarly, but conversely, any character or other text 112 included within the locked position 110 will remain within the locked position 110 while the text 112 is being deleted. Put another way, any such text 112 within the locked position 110 will not be pulled from the locked position 110 by spaces moving concurrently with the deleted text 112, as occurs in conventional text entry scenarios.

Moreover, the user entering the text 112 is not required to use the standard overwrite mode to maintain any text 112 within the locked position 110, while entering or deleting the text 112. As already described above, the act of switching to or from overwrite mode may be inconvenient (particularly if done repetitively). Additionally, overwrite mode may be undesirable because it overwrites existing characters, which must then be re-entered.

Consequently, for example, the user may obtain all of the advantages of the standard overwrite and insert modes, while still ensuring compatibility with the text interpreter 106. For example, the locked position 110 may be designated to include special-purpose text 112 to be used by the text interpreter 106. By ensuring that such special-purpose text 112 is maintained within the locked position 110, the format generator 108 therefore also ensures that the text interpreter 106 will be able to locate, obtain, and use the special-purpose text 112 for its intended purpose(s).

For example, as referenced above, and described in more detail, below, e.g., with respect to FIGS. 5 and 6, the text interpreter 106 may represent a particular type of compiler, while the text editor 102 may be intended for use in receiving a computer program written in a corresponding programming language. By ensuring inclusion of designated types of text 112 within the locked position 110, the format generator 108 thus ensures that compiling operations of the text interpreter 106 (e.g., compiler) will be accurate and complete.

Further in the example of FIG. 1, the format generator 108 includes a position lock selector 116. The position lock selector 116 may be configured to activate, designate, or otherwise select one or more locked positions represented by the locked position 110 in the simplified example of FIG. 1.

In example implementations, the text editor 102 and the GUI 104 may provide linear text entry. That is, a line of text 112 may be entered in a defined text entry direction. For example, the text 112 may be entered in a left-to-right direction, right-to-left direction, top-to-bottom direction, or bottom-to-top direction. Thus, for example, when a first character is entered into a first position, a subsequent second character is entered into a second position that is adjacent to the first position in a direction of the text entry direction, and within the text line.

When the text entry direction is left-to-right or right-to-left, the text line defines a text row. In these cases, the locked position 110 defines at least one column that is perpendicular to the text row.

When the text entry direction is top-to-bottom or bottom-to-top, the text line defines a text column. In these cases, the locked position 110 defines at least one row that is perpendicular to the text column.

In many of the following examples, a left-to-right text entry direction is assumed, so that the text 112 is entered as a text row, and the locked position 110 defines at least one column. However, it will be appreciated from the above discussion that such examples are non-limiting, and other text entry directions may be used, as well.

As referenced above, and illustrated below, e.g., with respect to FIGS. 5, 6, 8, and 10, the locked position 110 may be locked across multiple positions, and therefore may define an aggregate column that includes multiple adjacent positions. That is, the position lock selector 116 may be configured to designate two or more consecutive, adjacent, or sequential positions for locking. For example, in the examples provided above in which the GUI provides 100 positions, the locked position 110 may represent positions 72-80, as selected using the position lock selector 116.

As also illustrated below, the position lock selector 116 may be configured to select non-adjacent positions, to thereby define multiple, non-adjacent columns. For example, the position lock selector 116 may be configured to select positions 1-6 to define a first column, and the positions 72-80 to define a second column. Then, multiple dynamic insert areas may be defined between, or otherwise with relation to, the multiple columns.

The format generator 108 also may include a content lock selector 118. That is, in addition to locking a designated position using the position lock selector 116, the format generator 108 may be configured to use the content lock selector 118 to provide various types of locking of content that is entered into the locked positions.

For example, a column of locked positions may also be locked with respect to types of content that may be entered or edited therein. For example, such types of content may include a date, a time, or a user identifier. Content types may also be particular to the types of text 112 expected by the text interpreter 106, such as specific types of programming content when the text interpreter 106 represents a compiler.

In other examples, the content lock selector 118 may lock specific content items, e.g., specific text 112, within the at least one locked position 110. For example, the content lock selector 118 may lock a specific date, time, or user identifier.

The content lock selector 118 may be configured to add one or more tags to each locked position, or set of locked positions, indicating associated content or content type(s). As described below, the tags may be defined with respect to expected content types expected by the text interpreter 106, and/or may be provided to a user entering text 112 to facilitate accurate text entry.

When locking content or a content type, the content lock selector 118 may also provide different levels of editing privileges with respect thereto. For example, different users may be granted different types of editing privileges and the extent of editing privileges. For example, users may or may not be allowed to change a content type, which may also be referred to as, or designated using, a tag associated with a locked position(s).

A content generator 120 may be configured to auto-generate content for inclusion within the locked position(s) 110. For example, in the examples provided above, the content generator 120 may automatically generate and insert a current date, current time, or a user identifier of a current user entering text.

A highlight generator 122 may be configured to provide various types of visual indicators that may supplement other operations of the format generator 108, and otherwise facilitate convenient and accurate text entry by a user(s). For example, the highlight generator may use a color, font, format, or other visual indicator to identify locked positions.

In various example implementations, the position lock selector 116, the content lock selector 118, the content generator 120, and the highlight generator 122 may operate in conjunction with one another to achieve various intended effects. For example, the content lock selector 118 may be used to lock a content type for the locked position 110, the content generator 120 may then generate and auto-fill content of the selected, locked type within the locked position 110, and the highlight generator 122 may visually indicate that the locked position 110 is locked and includes content of the locked content type. Many other combinations of operations of the position lock selector 116, the content lock selector 118, the content generator 120, and the highlight generator 122 may be selected for implementation, as well.

The format generator 108 also includes a space handler 124 configured to manage the spaces within the dynamic insert area 114, as the text 112 is entered or deleted, and with respect to the locked position 110. That is, as referenced above, the space handler 124 may be configured to remove spaces as the text 112 is entered, and add spaces as the text 112 is deleted, so that any locked content or locked text within the locked position 110 is maintained within the locked position 110.

For example, a user may create or insert spaces following the end of a line of text, in order to position subsequent text of the text line into a desired position(s). In conventional scenarios (e.g., use of the conventional insert mode), any subsequent addition or removal of text or spaces ahead of the subsequent text causes the subsequent text to move out of its desired position. However, using the dynamic insert mode as described herein and implemented using the space handler 124, the subsequent text may be position-locked in its desired position, regardless of edits made to preceding text in the same line. Operations of the space handler 124 are described in more detail, below, e.g., with respect to FIGS. 3-6.

The format generator 108 may also include an interpreter interface 126. The interpreter interface 126 may be configured to ensure and enable compatibility with the text interpreter 106. For example, the interpreter interface 126 may obtain positions to be locked from internal rules of the text interpreter 106, and provide the obtained positions to the position lock selector 116 for subsequent corresponding locking of positions represented by the locked position 110. Similarly, the interpreter interface 126 may instruct the content lock selector 118 and the content generator 120 with respect to requirements of the text interpreter 106, to ensure that required content and content types are easily and accurately included within the locked position 110.

In the simplified example of FIG. 1, the text editor 102 is illustrated as being implemented using at least one computing device 128, which is illustrated as including at least one processor 130 and non-transitory computer-readable storage medium 132. For example, instructions may be stored on the computer-readable storage medium 132 and executed by the at least one processor 130 to provide the text editor 102 (including the format generator 108) and the GUI 104.

Of course, a system implementing the example of FIG. 1 may include many other types of hardware and software, not specifically illustrated in FIG. 1 for the sake of simplicity and brevity. For example, the GUI 104 may be provided using any suitable monitor or other display.

Figure 2:
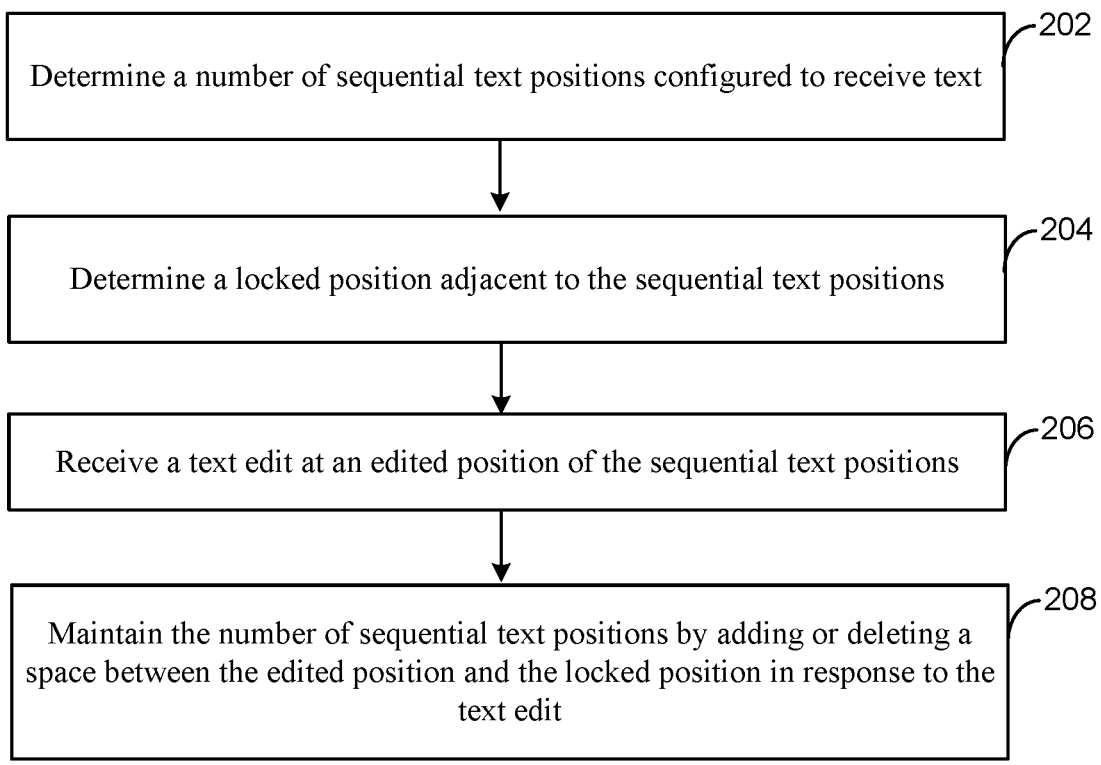
FIG. 2 is a flowchart illustrating example operations of the system of FIG. 1.

FIG. 2 is a flowchart illustrating example operations of the system of FIG. 1. In the example of FIG. 2, operations 202-208 are illustrated as separate, sequential operations. In various implementations, the operations 202-208 may include sub-operations, may be performed in a different order, may include alternative or additional operations, or may omit one or more operations. Further, in all such implementations, included operations may be performed in an iterative, looped, nested, or branched fashion.

In the example of FIG. 2, a number of sequential text positions configured to receive text may be determined (202). For example, the space handler 124 may determine a number of linear text positions in a left-to-right line of text 112 currently being edited by a user. For example, in FIG. 1, the text 112 and the dynamic insert area 114 may be defined with respect to a number of sequential text positions.

A locked position adjacent to the sequential text positions may be determined (204). For example, the position lock selector 116 may identify a position(s) at an end of the sequential text positions that has been identified as being locked for purposes of operations of the dynamic insert mode described herein. For example, the space handler 124 may receive the locked position(s) from the position lock selector 116. For example, in FIG. 1, the locked position 110 may identified at the end of the line of sequential text positions defined by the text 112 and the dynamic insert area 114.

A text edit at an edited position of the sequential text positions may be received (206). For example, the space handler 124 may determine that a received text edit adds a character of text or deletes a character of text. For example, in FIG. 1, a character of text may be added to the text 112 or deleted from the text 112.

The number of sequential text positions may be maintained by adding or deleting a space between the edited position and the locked position in response to the text edit (208). For example, the number of sequential text positions may be defined as a fixed number at a point in time of the dynamic insert operation, which includes all of the positions of the text 112 and the dynamic insert area 114.

For example, twenty positions may be included within the text 112 and the dynamic insert area 114, and positioned prior to the locked position 110, with ten positions of text 112 and ten positions (e.g., spaces) of the dynamic insert area 114. Then, if a text character is added to the text 112 to cause the text 112 to occupy 11 positions, the space handler 124 may remove/delete a space from the dynamic insert area 114 so that the dynamic insert area 114 occupies 9 positions. In this way, the total number of sequential positions prior to the locked position 110 remains at 20, and any locked text within the locked position 110 remains within the locked position 110.

Similarly, but conversely, if a text character is removed from the text 112 to cause the text 112 to occupy 9 positions, the space handler 124 may add/insert a space to the dynamic insert area 114 so that the dynamic insert area 114 occupies 11 positions. In this way, again, the total number of sequential positions prior to the locked position 110 remains at 20, and any locked text within the locked position 110 remains within the locked position 110.

In example implementations of FIG. 1, the dynamic insert area 114 may or may not be adjoining to text of the text 112 being edited. For example, a line of text 112 may include a first text segment, spaces, a second text segment, and then the dynamic insert area. In such cases, as illustrated and described below with respect to FIG. 10, text entered into any position prior to the dynamic insert area (e.g., into any of the first text segment, spaces, and/or the second text segment) may invoke operations of the space handler 124.

As referenced above, techniques described herein may be applied to define locked vertical columns when a text entry direction is horizontal along text entry rows or lines, or may be applied to define locked horizontal rows when a text entry direction is vertical along text entry columns or lines. More generally, described techniques provide a text editor that provides a plurality of lines for text entry, where the plurality of lines includes a line containing the sequential text positions as described in 208 of FIG. 2, and the locked position is included in a plurality of locked positions extending perpendicularly to the plurality of lines.

Figure 3:
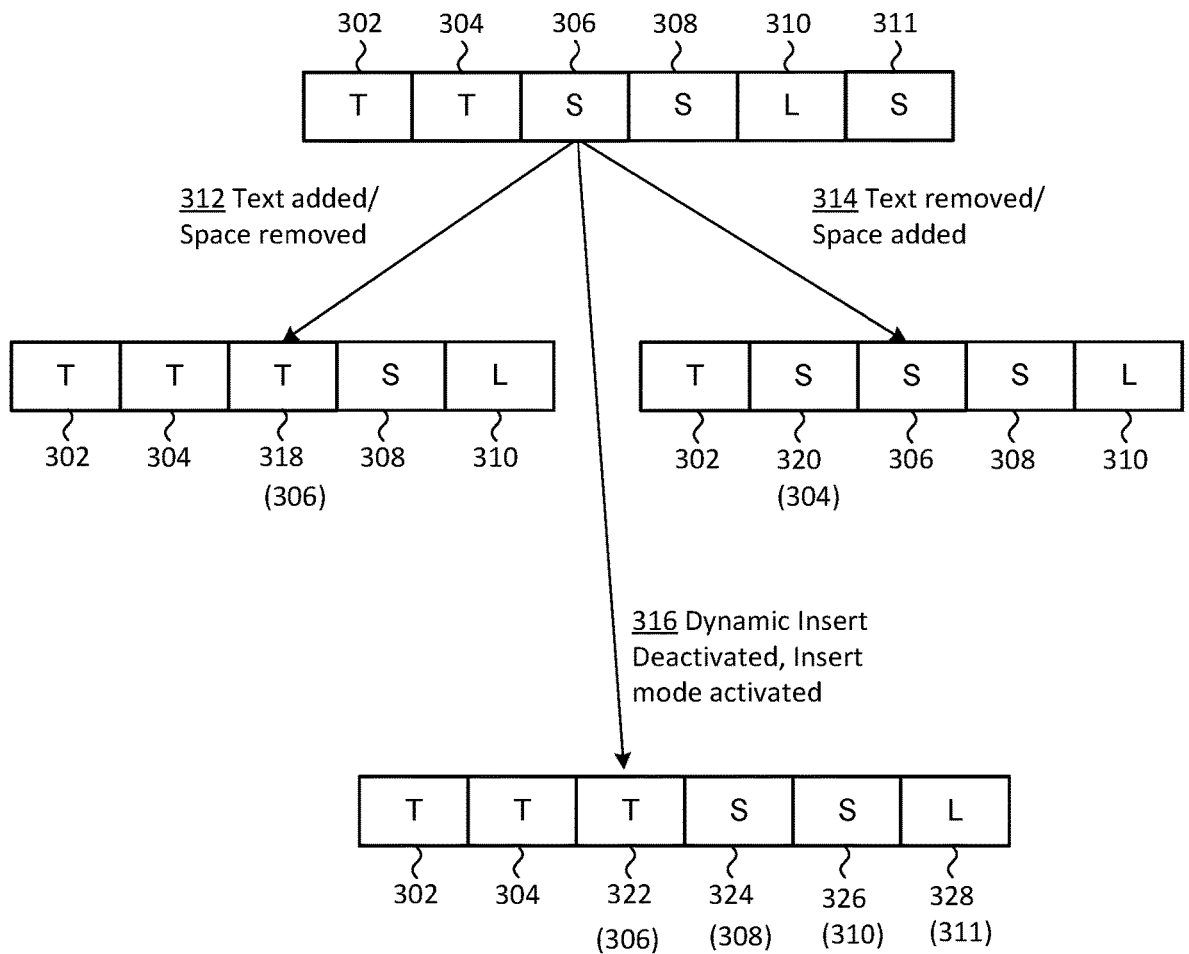
FIG. 3 is a block diagram illustrating example use cases in accordance with FIGS. 1 and 2.

FIG. 3 is a block diagram illustrating example use cases in accordance with FIGS. 1 and 2. In FIG. 3, sequential positions 302, 304, 306, 308, 310, and 311 are illustrated. In the simplified example of FIG. 3, a text character "T" is in position 302 and a text character "T" is in position 304, and both provide examples of the text 112 of FIG. 1. A space (indicated as "S" in FIG. 3) is in a position 306 and a space S is in position 308, and both provide examples of dynamic insert area 114 of FIG. 1. Locked text "L" 310 provides an example of position-locked text in the locked position 110 of FIG. 1. Thus, a number of sequential positions 302, 304, 306, and 308 adjacent to the locked position 310 is four in the simplified example. Also, a subsequent position 311 illustrates a space S after the locked position 310 in a left-to-right text entry direction.

In an example operation 312, while a dynamic insert mode is activated, text 112 is added to the dynamic insert area 114, resulting in additional text "T" at the position 306, indicated as position 318 in FIG. 3 for purposes of differentiation. As described above, and illustrated in FIG. 3, the space S at the position 306 is removed or deleted, and the total number of sequential text positions adjacent to the locked position 310 remains at four.

Similarly, but conversely, in an example operation 314, while a dynamic insert mode is activated, text 112 is removed from the text area, resulting in deletion of text "T" from the position 304. As described above, and illustrated in FIG. 3, a space S at the position 304 (indicated as position 320 in FIG. 3 for purposes of differentiation) is added, and the total number of sequential text positions adjacent to the locked position 310 again remains at four.

Also in FIG. 3, in an operation 316, the dynamic insert mode is deactivated, and a conventional insert mode is activated. Then, text 112 is added to the position 306, resulting in additional text "T" at the position 306, indicated as position 322 in FIG. 3 for purposes of differentiation. As described above, and illustrated in FIG. 3, the two spaces S at the positions 306, 308 are then moved in the left-to-right text entry direction, to occupy positions 308, 310 (indicated as positions 324, 326 in FIG. 3 for purposes of differentiation).

Consequently, the text L formerly within the position 310 (no longer locked) is moved to the position 311 (indicated as position 328 in FIG. 3 for purposes of differentiation). As described above, such undesired movement of text out of its designated area may lead to errors in compiling or other types of text interpretation, as the text L is no longer within the expected position 310.

Figure 4:
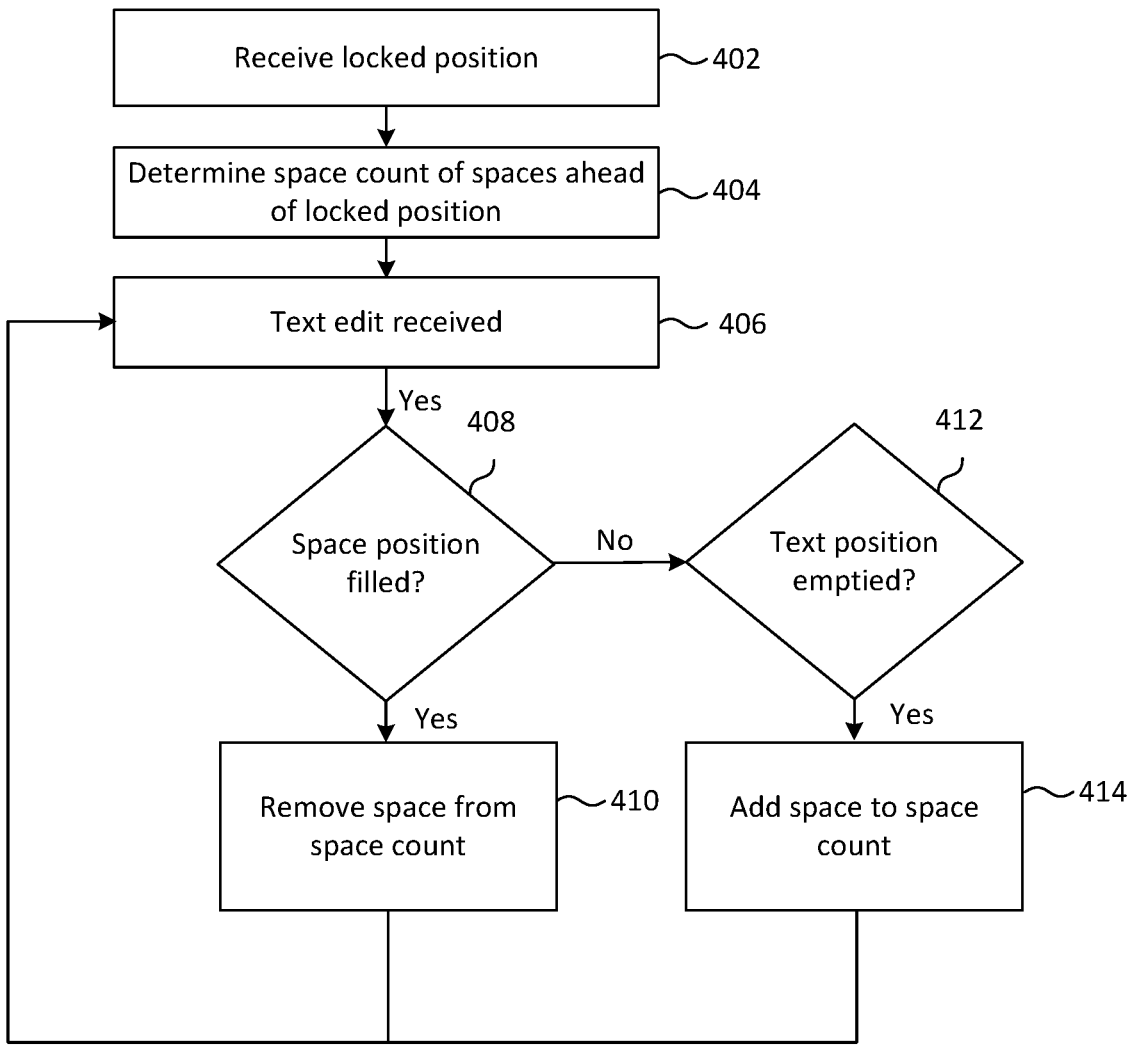
FIG. 4 is a flowchart illustrating a process flow according to the examples of FIGS. 1-3.

FIG. 4 is a flowchart illustrating a process flow according to the examples of FIGS. 1-3. In the example of FIG. 4, a locked position is received (402). For example, the position lock selector 116 may receive one or more locked positions. Not shown in FIG. 4, but referenced above and described in further detail with respect to FIGS. 7 and 9, additional features of the locked position may be specified or configured. For example, the content lock selector 118 may be used to specify specific content or types of content to be included within the locked position, including possibly specifying various permission levels associated with editing content or text 112 within the locked position (e.g., read-only). The content generator 120 may be configured to auto-generate the specified position-locked content or text, and the highlight generator 122 may be configured to visually indicate desired aspects of the various configured (e.g., locked) positions.

In conjunction with receiving the locked position, a space count of spaces ahead of the locked position may be determined (404). For example, in FIG. 3, the space count is 2 for the two positions 306, 308 that include spaces ahead of the locked position 310. As may be appreciated from the above description, the space count may be used to define the dynamic insert area 114 of FIG. 1.

A text edit may then be received (406). If a space position is filled (408) by the text edit, then a space may be removed from the space count (410). That is, a space at a space position may be remove or deleted, as described above with respect to the operation 312 of FIG. 3. It will be appreciated that a space position may be filled in one of multiple ways. For example, a text character may be added directly to a space position, or, in other examples, a text character may be inserted earlier within an existing line of text, causing an end character of that line of text (and intervening text characters) to advance into the position of the removed space.

If a space position is not filled (408) but a text position is emptied (412), then a space may be added to the space count (414). That is, for example, a space may be added to a position previously occupied by a text character, as described above with respect to the operation 314 of FIG. 3.

It will be appreciated that a text position may be emptied in one of multiple ways. For example, a text character at a text position that is at an end of a line of text 112 and adjacent to a space position may be deleted, and that end text position may be converted to provide the added space. In other examples, a text character may be deleted earlier within an existing line of text 112, causing an end character of that line of text 112 (and intervening text characters) to retreat from an end text position and away from the locked position, with the added space being added to the end text position.

FIG. 5 illustrates an example of FIGS. 1-4, in the context of the COBOL programming language. FIG. 6 illustrates an example of FIGS. 1-4, in the context of the Assembly programming language.

As referenced above, some programming languages like COBOL, PL/I, and Assembly are column based in the sense that text 112, or specific characters, in certain columns have special meaning(s). For a conventional text editor displaying non-double byte characters, a column is really the number of characters in a line. For example, the seventh column would be the seventh character (or byte) in a line of text 112. As also referenced above, when double byte characters are used, then byte may be substituted for column.

In the COBOL example of FIG. 5, a first column 502 includes locked positions 1-6 defining a sequence area. In the illustrated row, a line 504 includes example characters 123456. Of course, multiple rows may be included, as shown below with respect to FIGS. 8 and 10.

Editable area 506 is defined as a column having editable positions 7-71, which, like the column 502, may extend across many different rows (not illustrated in FIG. 5). The illustrated row may include editable text 508 within the column 506. As described above with respect to FIG. 1, the column 506 thus potentially includes both the (editable) text 112 and the dynamic insert area 114. Consequently, the text 508 may have a maximum number of characters corresponding to the column 506, and character entry or removal of an individual character may cause corresponding space removal or entry of a corresponding individual space.

Specifically, a second locked column 512 may be defined and included as locked positions 72-80, which may be referred to as an identity or program area in COBOL. Locked text 514 may be included therein, as shown.

A further editable column 516 may be included from column or position 81 forward, up to a remaining maximum number of positions. As shown, more editable text 518 may be included with respect to the editable column 516.

As noted above with respect to the content lock selector 118 and the content generator 120, various approaches may be taken with respect to receiving text 112 within locked columns 502, 512. For example, a user may be given editing rights for a locked column, or may only have read-only access, and/or content may be automatically generated (e.g., statically or sequentially) and entered into one or more locked columns.

When any content is entered into a locked column, described techniques may be used to ensure that all other text 112 within a row being edited remains within its designated column, as well. For example, an overwrite mode may be enabled when entering text 112 into the locked column 502, so that insertion of text 112 therein does not advance the text 508 within the editable column 506.

In other implementations, the dynamic insert techniques described herein may be applied to a locked column by the space handler 124, as well. In these implementations, for example, a total number of positions within the locked column 502 or the locked column 512 may be maintained as characters are entered or removed. Consequently, any text 112 in subsequent columns of the row will be maintained within desired columns.

Thus, FIG. 5 illustrates that multiple groups of positions may be locked to define multiple columns. Remaining columns or positions may be identified as editable columns. Virtually any number of locked columns and editable columns may be defined. Within editable columns occurring prior and adjacent to a locked column with respect to a text entry direction, such as the editable column 506, the total number of entered characters and spaces may be maintained as equaling a total number of positions within the editable column, by adding or deleting spaces within the editable column 506 as described herein.

FIG. 6 illustrates a similar example for Assembly programming language. In FIG. 6, an editable column 602 includes, within the illustrated row, editable text 604. A first locked column 606 defines positions to receive editable text 608 within corresponding row(s), while a second locked column 610 defines positions to receive editable text 612 within corresponding row(s). An editable column 614 may define a column in which to receive further editable text 616.

Thus, FIGS. 5 and 6 illustrate a high degree of flexibility in defining one or more (groups of) locked positions defining locked columns and remaining editable positions/columns. More generally, virtually any available number of locked columns and editable columns may be defined, each of any desired width, and positioned wherever desired with respect to one another.

Figure 7:
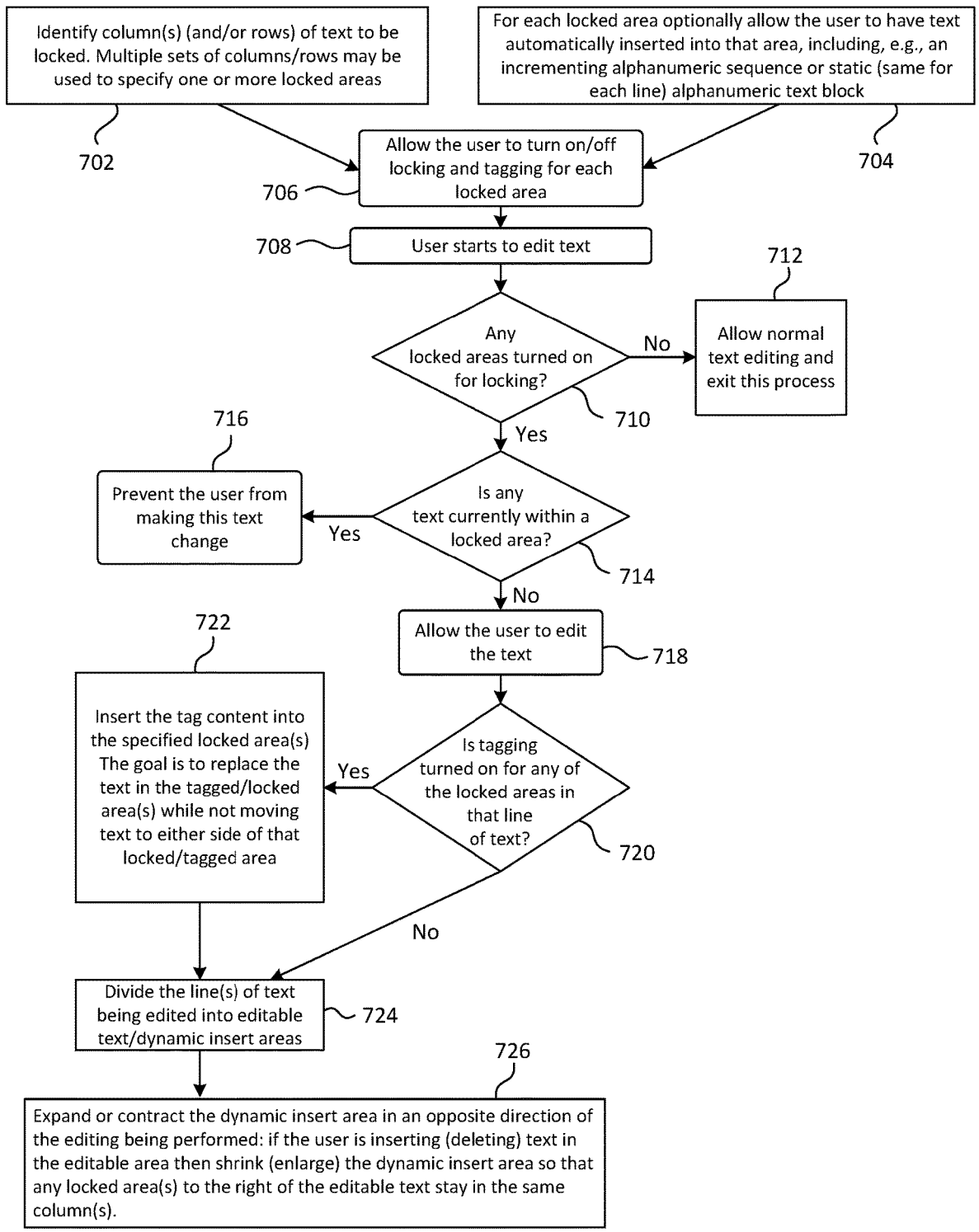
FIG. 7 is a flowchart illustrating a more detailed example process flow according to the examples of FIGS. 1-6.

FIG. 7 is a flowchart illustrating a more detailed example process flow according to the examples of FIGS. 1-6. In the example of FIG. 7, columns and/or rows to be locked may be identified (702), e.g. by the position lock selector 116. As noted in FIG. 7, and appreciated from the above discussion, multiple sets of columns/rows may be used to specify one or more locked areas. While the position lock detector 116 is configured to lock positions as described above, the content lock selector 118, as also described above with respect to FIG. 1, may also be configured to lock content within each locked position. For example, locked content within a locked position may be designated as read-only.

The content generator 120 of FIG. 1 may be configured to autogenerate and insert specified text or type of text into the locked positions (704). For example, generated and inserted text may include an incremented (e.g., at each row) alpha-numeric sequence. In other examples, the inserted text may be static, e.g., at each row of a locked column. For example, as described with respect to the content lock selector 118 and the content generator 120, such designations of individual columns and included text may be referred to as tagging. The highlight generator 122 may also be configured to visually indicate a manner and extent of tagging in a particular implementation.

Thus, in FIG. 7, operations 702, 704 illustrate configuration options that a user may turn on or off or tag in a locked area during active configuration operations (706). Example configuration techniques are illustrated and described below, e.g., with respect to FIG. 9.

When a user subsequently starts to edit text (708), then a determination may be made as to whether any of the previously-defined locked areas have been turned on for locking purposes (710). If not, normal text editing may proceed (712), e.g., using conventional insert and/or overwrite modes.

Otherwise, if any locked areas have been turned on for locking (710), during editing, a determination may be made as to whether any text 112 attempting to be edited is within a locked area (714). If so, then the user may be prevented from making the attempted text change (716). Otherwise, if the text 112 is not currently within a locked area (714), then the user may be allowed to edit the text 112 within the locked area (718).

If tagging is turned on for any locked area(s) in a line of text 112 being edited (720), then content specified by the tagging, which may be referred to as tag content, may be autogenerated by the content generator 120 and inserted into the specified locked area(s). As described above, the tag content may be added without moving any text 112 on either side of the locked area/column into which the tagged content is inserted.

Once completed, or if tagging is not turned on for any locked area(s) in a line of text 112 being edited (720), then the space handling procedures of the space handler 124 may be initiated by dividing the line(s) of text 112 being edited into editable text or dynamic insert area(s) (724), such as the text 112 and the dynamic insert area 114 of FIG. 1. Consequently, as the user enters text, and as described herein, the dynamic insert area 114 may be expanded or contracted in an opposite direction of the editing being performed (726). That is, if the user is inserting (deleting) text 112 in the editable area then the dynamic insert area 114 may be shrunk (enlarged), so that any locked area(s) to the right of the text 112 stay in the same column(s).

FIG. 8 is a first example screenshot illustrating an example implementation. FIG. 8 illustrates a COBOL editor screen operating in a conventional insert mode. As shown, the interface includes a column 802, a column 804, a column 806, a column 808, and a column 810. For example, the locked column 804 may correspond to the locked column 502 of FIG. 5, and the locked column 808 may correspond to the locked column 512 of FIG. 5.

When text 812 is entered into line 15 within the column 806, then text 814 that was previously entered into the column 808 is partially pushed or advanced into the column 810. As described, such a result is undesirable. For example, content of the column 808 may be a designated type of content required and expected by a compiler for the COBOL program being entered and edited. In such cases, in the conventional insert mode of FIG. 8, the text 814 would need to be manually moved back into the column 808 to avoid a compiling error.

Figure 9:
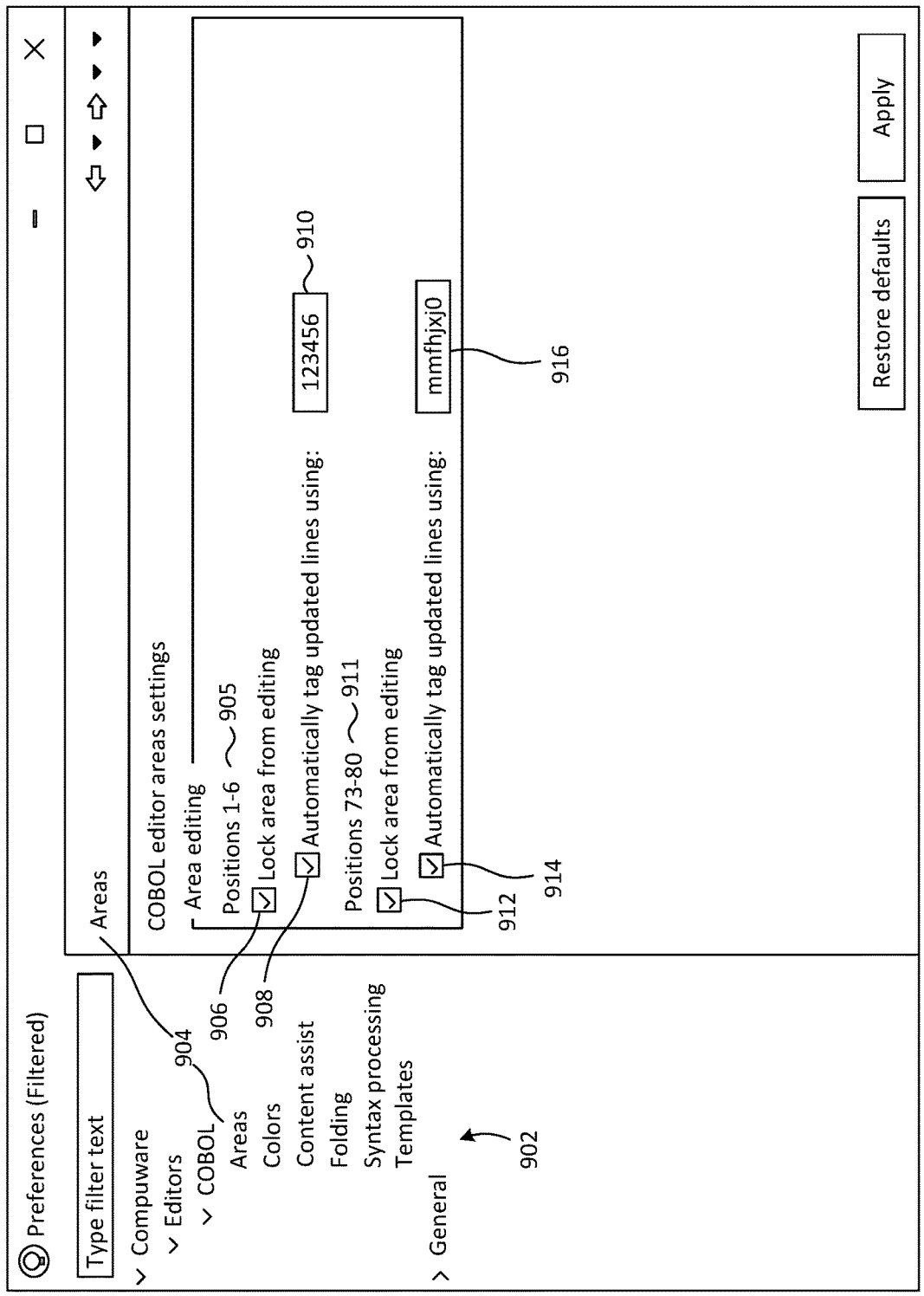
FIG. 9 is a second example screenshot illustrating the example implementation of FIG. 8.

FIG. 9 is a second example screenshot illustrating the example implementation of FIG. 8. As shown, FIG. 9 is a configuration window which may be used to change an operational mode of text entry from the conventional insert mode of FIG. 8 into the dynamic insert mode of FIG. 10, in accordance with the techniques described above with respect to FIGS. 1-7.

In the example of FIG. 9, a settings area 902 provides a number of configuration options with respect to the text editor of FIG. 8. As also shown, a configuration option for areas 904 is selected, which provides a number of optional settings for defining or characterizing editor areas with respect to the example of FIG. 8.

As further illustrated, line 905 indicates positions one to six as a potential locked area or column. Then, a checkbox 906 may be selected to designate the locked area 905 as being locked from editing. A check box 908 may also be selected to enable automatic tagging of lines within the locked area 905. A text entry box 910 may be provided to receive the text 112 to be used in the automatic tagging.

Line 911 indicates positions 73-80 as a potential locked area or column. Then, a checkbox 912 may be selected to designate the locked area 911 as being locked from editing. A check box 914 may also be selected to enable automatic tagging of lines within the locked area 911. A text entry box 916 may be provided to receive the text 112 to be used in the automatic tagging.

FIG. 10 is a third example screenshot illustrating the example implementation of FIGS. 8 and 9. That is, FIG. 10 illustrates the example of FIG. 8, but with the configuration options of FIG. 9 being enabled.

In the example of FIG. 10, text 1002 is entered within the line 15. Due to spaces 1004 existing between the text 1002 and text 1006, text 1006 is advanced towards the locked column 808. However, a dynamic insert area 1008 between the text 1006 and the locked column 808 prevents text 1010 from being advanced out of the column 808 and into the column 810, as occurred in the example of FIG. 8.

Many conventional text editors may display proportional or fixed-width fonts, but do not provide column alignment. The user can choose to use a fixed-width font to provide an illusion of text aligned in a column, but as described herein, conventional editors may not have an ability to recognize or interpret certain key columns designated for a specific purpose (e.g., compiling). Conventional editors also fail to give the user any ability to lock in place and/or make read-only specific columns in a line of text 112.

In contrast, described techniques enable an otherwise non-column-based text editor to recognize certain columns and lock them in place. Then, text 112 entered into those columns stays in those columns regardless of editing of text 112 before or after the locked text 112. If desired, the locked areas may also be designated as read only, while surrounding text 112 is editable.

Further, described techniques provide a dynamic insert mode, which, e.g., only overwrites spaces between a locked area and the text 112 the user is editing. Dynamic insert mode may shrink or expand the intervening space as needed, thereby providing the user with a natural editing experience. The spaces that are being expanded or contracted may or may not be immediately adjacent to the text 112 the user is editing, but may be included on the same line being edited.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   display a number of sequential text positions configured to receive text;
   display a locked position adjacent to the sequential text positions;
   receive a text edit at an edited position of the sequential text positions; and
   display the number of sequential text positions including adding or deleting a space between the edited position and the locked position in response to the text edit.

2. The computer program product of claim 1, wherein the instructions, when executed, are further configured to cause the at least one computing device to:
   determine the number of sequential text positions within a line of text entered in a text entry direction, wherein the locked position occurs after the sequential text positions with respect to the text entry direction.

3. The computer program product of claim 2, wherein the instructions, when executed, are further configured to cause the at least one computing device to:
   determine at least a second locked position that occurs prior to the sequential text positions with respect to the text entry direction.

4. The computer program product of claim 1, wherein the instructions, when executed, are further configured to cause the at least one computing device to:
   determine the locked position as including at least two adjacent locked positions adjacent to the sequential text positions, the at least two locked positions defining a locked column designated to receive a corresponding content type.

5. The computer program product of claim 1, wherein the text edit includes an insertion or removal of a character, and the instructions, when executed, are further configured to cause the at least one computing device to:
   delete the space between the edited position and the locked position in response to the insertion of the character or add the space between the edited position and the locked position in response to the deletion of the character.

6. The computer program product of claim 1, wherein the instructions, when executed, are further configured to cause the at least one computing device to:
   maintain locked text within the locked position in response to the text edit.

7. The computer program product of claim 1, wherein the instructions, when executed, are further configured to cause the at least one computing device to:
   generate locked text within the locked position; and
   designate the locked text as read-only.

8. The computer program product of claim 1, wherein the instructions, when executed, are further configured to cause the at least one computing device to:
   designate the locked position as including content of a content type; and
   display a visual indicator in conjunction with the locked position to indicate the content as being of the content type.

9. The computer program product of claim 1, wherein the instructions, when executed, are further configured to cause the at least one computing device to:
   receive the text within a text editor that provides a plurality of lines for text entry, the plurality of lines including a line containing the sequential text positions, wherein the locked position is included in a plurality of locked positions extending perpendicularly to the plurality of lines.

10. The computer program product of claim 1, wherein the instructions, when executed, are further configured to cause the at least one computing device to:
   provide content within the locked position to a text interpreter using an interface that designates the locked position as including a content type.

11. A method implemented using at least one computing device, the method comprising:
   displaying a number of sequential text positions configured to receive text;

displaying a locked position adjacent to the sequential text positions;

receiving a text edit at an edited position of the sequential text positions; and displaying the number of sequential text positions PA including adding or deleting a space between the edited position and the locked position in response to the text edit.

12. The method of claim 11, further comprising:

determining the number of sequential text positions within a line of text entered in a text entry direction, wherein the locked position occurs after the sequential text positions with respect to the text entry direction.

13. The method of claim 11, further comprising:

determining the locked position as including at least two adjacent locked positions adjacent to the sequential text positions, the at least two locked positions defining a locked column designated to receive a corresponding content type.

14. The method of claim 11, wherein the text edit includes an insertion or removal of a character, and wherein the method further comprises:

deleting the space between the edited position and the locked position in response to the insertion of the character or adding the space between the edited position and the locked position in response to the deletion of the character.

15. The method of claim 11, further comprising:

maintaining locked text within the locked position in response to the text edit.

16. The method of claim 11, further comprising:

generating locked text within the locked position; and designating the locked text as read-only.

17. The method of claim 11, further comprising:

receiving the text within a text editor that provides a plurality of lines for text entry, the plurality of lines including a line containing the sequential text positions, wherein the locked position is included in a plurality of locked positions extending perpendicularly to the plurality of lines.

18. A system comprising:

at least one memory including instructions; and at least one processor that is operably coupled to the at least one memory and that is arranged and configured to execute instructions that, when executed, cause the at least one processor to:

display a number of sequential text positions configured to receive text;

display a locked position adjacent to the sequential text positions;

receive a text edit at an edited position of the sequential text positions; and display the number of sequential text positions including adding or deleting a space between the edited position and the locked position in response to the text edit.

19. The system of claim 18, wherein the instructions, when executed, are further configured to cause the at least one processor to:

determine the number of sequential text positions within a line of text entered in a text entry direction, wherein the locked position occurs after the sequential text positions with respect to the text entry direction.

20. The system of claim 18, wherein the instructions, when executed, are further configured to cause the at least one processor to:

determine the locked position as including at least two adjacent locked positions adjacent to the sequential text positions, the at least two locked positions defining a locked column designated to receive a corresponding content type.

* * * * *

UNITED STATES PATENT AND TRADEMARK OFFICE
CERTIFICATE OF CORRECTION

| | | |
|---|---|---|
| PATENT NO. | : 11,972,199 B2 | Page 1 of 1 |
| APPLICATION NO. | : 17/652827 | |
| DATED | : April 30, 2024 | |
| INVENTOR(S) | : Jonah | |

It is certified that error appears in the above-identified patent and that said Letters Patent is hereby corrected as shown below:

In the Claims

In Column 17, Claim 11, Line 5, after "positions", delete "PA".

Signed and Sealed this
Twenty-seventh Day of August, 2024

Katherine Kelly Vidal
*Director of the United States Patent and Trademark Office*